US008737737B1

(12) United States Patent
Feldman et al.

(10) Patent No.: US 8,737,737 B1
(45) Date of Patent: May 27, 2014

(54) REPRESENTING IMAGE PATCHES FOR MATCHING

(75) Inventors: Bryan E. Feldman, San Francisco, CA (US); Arnab S. Dhua, Mountain View, CA (US); Nalin Pradeep Senthamil, Santa Clara, CA (US)

(73) Assignee: A9.com, Inc., Palo Alto, CA (US)

( * ) Notice: Subject to any disclaimer, the term of this patent is extended or adjusted under 35 U.S.C. 154(b) by 257 days.

(21) Appl. No.: 13/429,135

(22) Filed: Mar. 23, 2012

(51) Int. Cl.
*G06K 9/00* (2006.01)
*G06K 9/46* (2006.01)
*G06K 9/50* (2006.01)

(52) U.S. Cl.
CPC .................................... *G06K 9/4642* (2013.01)
USPC .......................................... 382/170; 382/168

(58) Field of Classification Search
None
See application file for complete search history.

(56) References Cited

U.S. PATENT DOCUMENTS

2011/0286627 A1* 11/2011 Takacs et al. ................. 382/103
2012/0170852 A1* 7/2012 Zhang et al. .................. 382/197

* cited by examiner

*Primary Examiner* — Amara Abdi
(74) *Attorney, Agent, or Firm* — Novak Druce Connolly Bove + Quigg LLP

(57) ABSTRACT

Processes such as image matching can be improved by utilizing a Polar Accumulated Signed Gradient (PASG), a feature descriptor vector that utilizes polar coordinates. Such an approach is efficient because it avoids the costly image rotation and resampling of conventional processes. Further, the gradients can be sampled over different regions in order to achieve effective weighting without analyzing all gradients and applying a weighting factor. Such efficiencies enable image matching to be performed on devices with limited computing capacity, such as smart phones and tablet computers.

14 Claims, 7 Drawing Sheets

REPRESENTING IMAGE PATCHES FOR MATCHING

BACKGROUND

Image matching is a fundamental technique for applications such as computer vision, object recognition, motion tracking, and three-dimensional modeling. Image matching is performed to determine whether two images represent the same content, even though those images may not be exactly the same. For example, the content in one image may be rotated or taken from a different viewpoint as compared to the content in another image, may be a zoomed version of the other image, or may have been taken under different lighting conditions. Conventional image matching algorithms find discriminative regions or "patches" of an image using a keypoint detector. A feature descriptor is used to describe the patch in a way that is robust to illumination changes, rotations, and viewing angle. Feature descriptors thus enable a determination that image patches from two different images include views of the same content, despite differences in the patches pixel values due to conditions under which the scene was imaged. Since this is such a fundamental operation, it is important to make this process as efficient as possible.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to performing image matching in an electronic environment. In particular, various embodiments utilize a polar accumulated signed gradient (PASG)-based approach that does not require a rotational resampling of the image of interest to obtain rotational invariance, thus reducing the computational requirements versus conventional approaches. A PASG has some similar aspects to an accumulated signed gradient (ASG), and can be used similarly to other local feature descriptors. A PASG-based approach, however, allows for more fine-tuned and meaningful control over feature descriptor parameters in addition to the decrease in computing requirements. Further, various approaches enable a sampling of gradients to be analyzed, which further reduces computational requirements and avoids the need for application of various weighting factors to gradients at different locations. The reduction in computing requirements enables image matching to be performed on limited capacity devices, such as smart phones and tablet computers. Further, such approaches provide increased control over the matching process, where a user can adjust to a desired balance of accuracy and speed.

Various other applications, processes, and uses are presented below with respect to the various embodiments.

Figure 1:
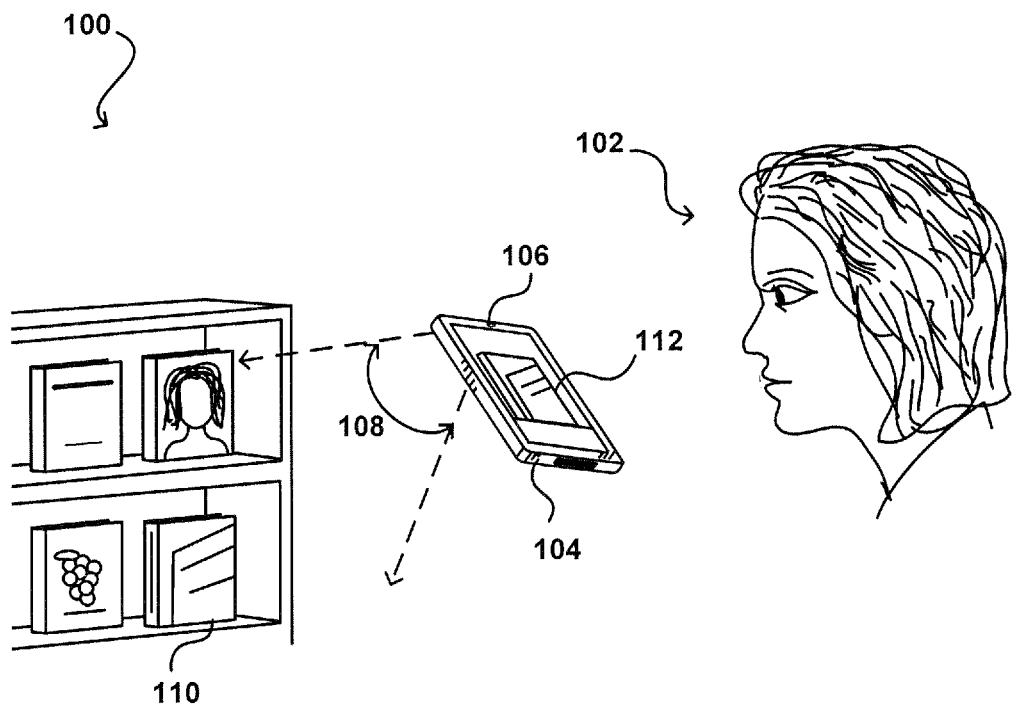
FIG. 1 illustrates an example environment in which aspects of the various embodiments can be that can be utilized.

FIG. 1 illustrates an example environment 100 in which aspects of the various embodiments can be implemented. In this example, a user 102 is in a bookstore and is interested in obtaining information about a book 110 of interest. Using an appropriate application executing on a computing device 104, the user is able to obtain an image of the book 110 by positioning the computing device such that the book is within a field of view 108 of at least one camera 106 of the computing device. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players.

In this example, a camera on the device 104 can capture at least one image including the book 110 of interest, and at least a portion of the image can be displayed on a display screen 112 of the computing device. In other embodiments, a user might capture video or other image information, with at least one frame of the video or information being displayed on the display screen. At least a portion of the image can be analyzed and, upon a match being located, identifying information can be displayed back to the user via the display screen 112 of the computing device 104. The portion of the image to be analyzed can be indicated manually, such as by a user pointing to the book on the screen or drawing a bounding box around the book. In other embodiments, one or more image analysis algorithms can attempt to locate one or more elements to be analyzed. Examples of image matching algorithms can be found, for example, in co-pending U.S. patent application Ser. No. 12/378,599, filed Feb. 18, 2009, and entitled "Method and System for Image Matching," which is hereby incorporated herein by reference. In some embodiments, a user can manually cause image information to be analyzed, while in other embodiments the image information can be analyzed automatically, either on the device or by streaming data to a remote system or service as discussed later herein.

Figure 2:
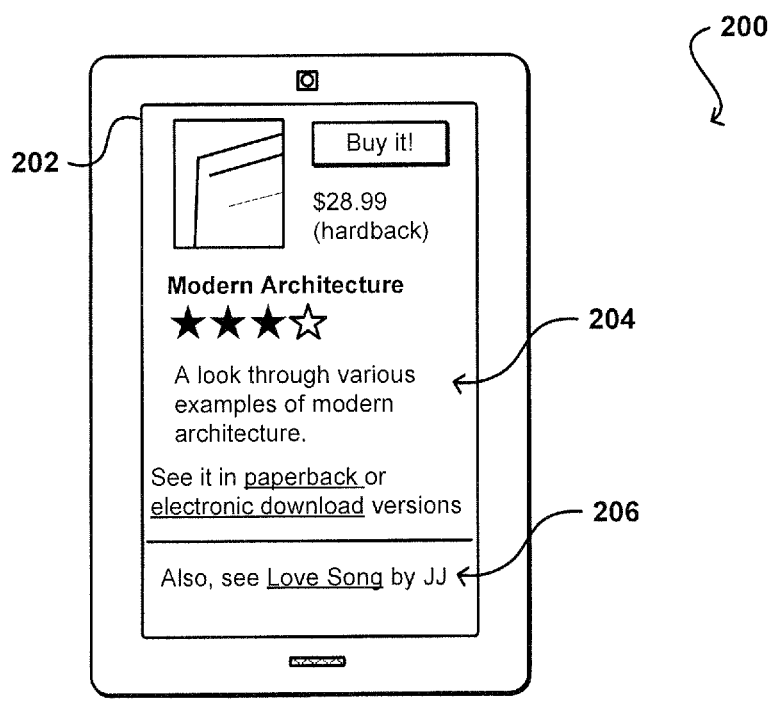
FIG. 2 illustrates an example display that can be presented in accordance with various embodiments.

FIG. 2 illustrates an example of a type of information 204 that could be displayed to the user via a display screen 202 of a computing device 200 in accordance with various embodiments. In this example, the image captured by the user has been analyzed and related information 204 is displayed on the screen. The "related" information as discussed elsewhere herein can include any information related to an object, item, product, or other element that is matched (within at least a level of confidence) to the scene data using one or more matching algorithms, or other such approaches. The displayed information in this example includes the title of the located book, an image of the book (as captured by the user or otherwise obtained), pricing and description information, and review information. Also as shown are options to purchase the book, as well as options for various other versions or forms of that content, such as a paperback book or digital download. In at least some embodiments, the user can have the option to save or bookmark information about the book for retrieval at a later time, such as to purchase the book or locate the book in a library or physical bookstore. The user can also request that the information be provided in a separate message or communication, such as to receive information to a user's phone via SMS or text, to have information posted to a social networking site, etc. The type of information displayed (or otherwise conveyed) can depend at least in part upon the type of content located or matched. For example, a located album might include artist and title information, as well as audio formats in which the song is available. For facial recognition, the information might include name, title, and contact information. Various other types of information can be displayed as well within the scope of the various embodiments.

Figure 3:
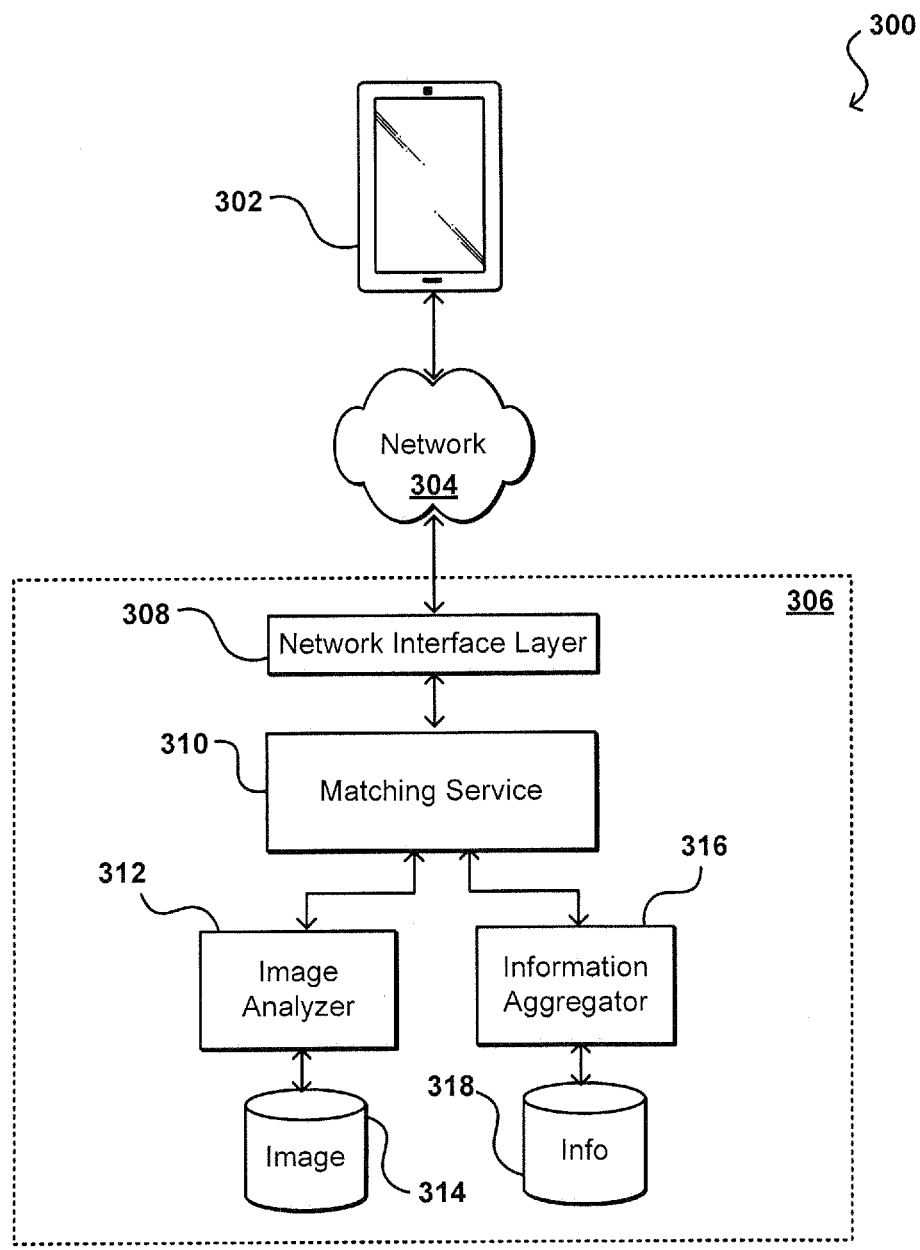
FIG. 3 illustrates an example system for identifying elements and providing information that can be utilized in accordance with various embodiments.

As discussed, information such as that illustrated in FIG. 2 can be located by sending an image and/or other electronic data to a system or service operable to find one or more potential matches for that data and provide related information for those potential matches. FIG. 3 illustrates an example environment 300 in which such information can be located and transferred in accordance with various embodiments. In this example, a user is able to capture one or more types of information using at least one computing device 302. For example, a user can cause a device to capture an image (or set of images or video), and can send at least a portion of that image information across at least one appropriate network 304 to attempt to obtain information for one or more objects represented in the image information. The network 304 can be any appropriate network, such as may include the Internet, a local area network (LAN), a cellular network, and the like. The request can be sent to an appropriate content provider 306, as may provide one or more services, systems, or applications for processing such requests. The information can be sent by streaming or otherwise transmitting data as soon as it is selected, obtained, and/or ready for transmission, or can be sent in batches or through periodic communications.

In the example of FIG. 3, the request is received by a network interface layer 308 of the content provider 306. The network interface layer can include any appropriate components known or used to receive requests from across a network, such as may include one or more application programming interfaces (APIs) or other such interfaces for receiving such requests. The network interface layer 308 might be owned and operated by the provider, or leveraged by the provider as part of a shared resource or "cloud" offering. The network interface layer can receive and analyze the request, and cause at least a portion of the information in the request to be directed to an appropriate system or service, such as a matching service 310 as illustrated in FIG. 3. A matching service in this example includes components operable to receive image data and cause that image data to be matched against a set of image information. The matching service 310 also can, in at least some embodiments, provide information about an object contained in the matched image. For example, upon matching a book cover image as in FIG. 1 the matching service 310 can cause information about that book to be sent to the user.

The matching service 310 in this example can cause information to be sent to at least one image analyzer 312, implemented as a system, service, or module, for example, that is operable to analyze the image data and attempt to match that image data against images or image information stored in at least one image data store 314 or other such location. Various other services, device, modules, and combinations thereof can be utilized as well within the scope of different embodiments. The data in the matching location data store might be indexed and/or processed to facilitate with matching, as known for such purposes. For example, the data store might include information for unique features or vectors for an image instead of a copy of the image itself, which can increase the speed and lower the processing requirements of the matching.

The matching service 310 can receive information from each contacted image analyzer 312 as to whether one or more matches could be found for the image information, and can receive any appropriate information for a located potential match. The information from each identification service can be analyzed and/or processed by one or more applications of the matching service, such as to determine data useful in obtaining information for each of the potential matches to provide to the user. For example, a matching service might receive image references, bar codes, product identifiers, or any other types of data from the image analyzer(s), and might process that data to be provided to a service such as an information aggregator 316 that is capable of locating descriptions or other content related to the located potential matches, as may be stored in at least one information data store 318 or other such location.

In at least some embodiments, an information aggregator might be associated with an entity that provides an electronic marketplace, or otherwise provides items or content for consumption (e.g., purchase, rent, lease, or download) by various customers. Although products and electronic commerce are presented throughout the present description, it should be understood that these are merely examples and that approaches presented in the present disclosure can relate to any appropriate types of elements or information as discussed and suggested elsewhere herein. In such an instance, the information aggregator service 316 can utilize the data from the matching service 310 to attempt to locate products that are offered through the marketplace and that match, or are otherwise related to, the located digital entities. For example, if the image analyzer identifies a book within an image, the information aggregator can attempt to determine whether there are any versions of that book (physical or electronic) offered through the marketplace, or at least for which information is available through the marketplace. In at least some embodiments, the information aggregator can utilize one or more suggestion algorithms or other such approaches to attempt to determine related elements that might be of interest based on the determined matches, such as a movie or audio tape version of a book. In some embodiments, the information aggregator can return various types of data (or metadata) to the environmental information service, as may include title information, availability, reviews, and the like. For facial recognition applications, a data aggregator might instead be used that provides data from one or more social networking sites, professional data services, or other such entities. In other embodiments, the information aggregator might instead return information such as a product identifier, uniform resource locator (URL), or other such digital entity enabling a browser or other interface on the client device 302 to obtain information for one or more products, etc. Various other types of information can be returned as well within the scope of the various embodiments.

Thus, a user capturing or otherwise obtaining an image that the user wants to match can submit that image to an application, system, or service operable to perform image matching. In many instances, a set of algorithms or processes will be used that attempt to describe one or more regions of that image in a way that is substantially independent of aspects such as lighting and small adjustments in viewing angle. A common approach is to attempt to compute gradients within various patches of the image and generate a histogram. The gradients of a patch can point in many different directions. An approach such as an accumulated signed gradient (ASG) approach analyzes the gradients of a patch, determines the direction of the gradients, and generates a histogram based upon the location of the patch and the direction that the gradients are pointing.

In at least some feature descriptor-based matching approaches, one or more locations in the image are determined that are to be converted to a feature descriptor. A dominant orientation is determined at each location, and the original image is resampled to create an image patch such that the dominant orientation is rotated to some canonical direction (e.g., the x axis). Next, gradients of the image patch are accumulated into a histogram where the histogram bin is determined by the location within the patch and the direction of the gradient.

Figure 4A:
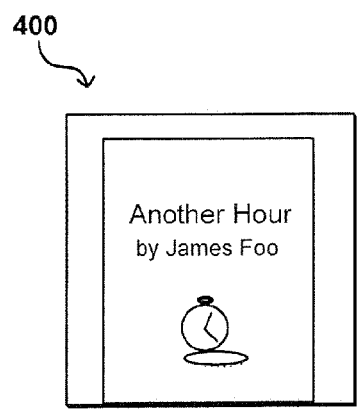
FIGS. 4(a), 4(b), and 4(c) illustrate a conventional process for generating a histogram vector for use in matching an image.

As an example, FIG. 4(a) illustrates an image 400 that a user might want to match against image content for any of a number of reasons, such as to identify the objects in the image, locate a book having that image on the cover, or another such purpose. This particular example image includes a portion of a book cover, and as such could be mapped against various cover images. As discussed, however, the cover images could differ in a number of ways, such as rotation angle, differences in illumination or intensity of the image colors, and the like Various keypoints or feature points can be located in the image, with a subset of these points being used to match the image. The selected subset can include points that meet certain criteria, as discussed elsewhere herein, and in some embodiments the selection can include at least one keypoint in each region or at most one keypoint from each region. As known in the art, keypoints can be defined as the locations of local maxima or minima of at least a portion of an image, which can be determined in at least some embodiments by comparing each pixels to neighboring pixels to select candidate keypoints. In some embodiments, keypoints are identified by finding the Harris corner measure at different points and identifying the local maxima in the Harris corner measure as feature points. As mentioned, such a keypoint generation process typically generates too many keypoint candidates, with at least some of those candidates potentially being unstable. As a next step in the process, one or more algorithms can be applied to perform a fit of the candidates to nearby data for information such as location and scale, to attempt to reject candidates with low contrast or that are poorly localized.

Figure 4B:
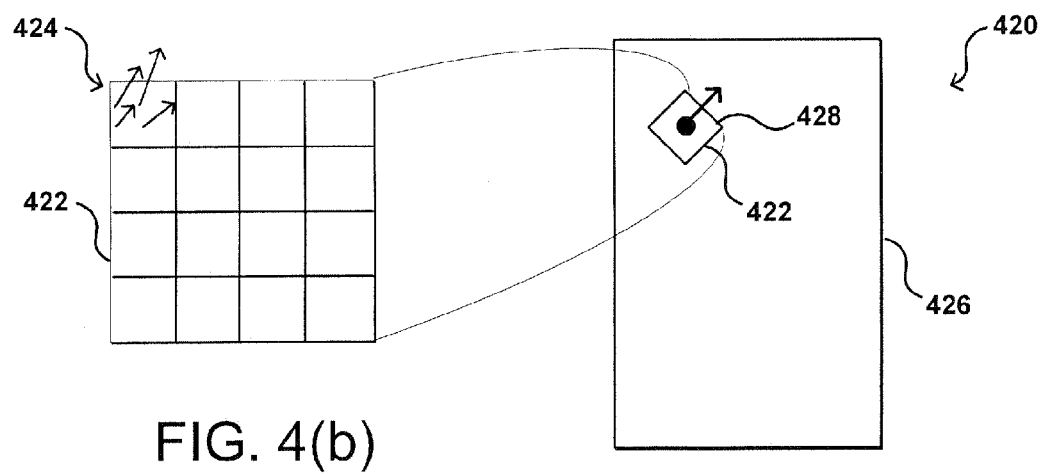
Figure 4C:
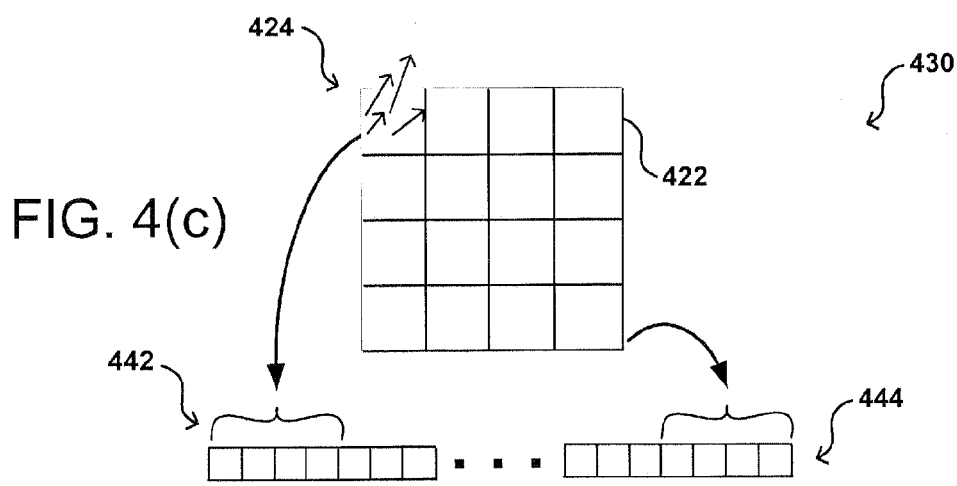

Once a set of keypoints to be analyzed is determined, the orientation at a given keypoint 428 is determined, with the orientation being shown by the corresponding arrow at the keypoint in the example situation 420 of FIG. 4(b). The orientation of a keypoint is determined by combining the orientations obtained from a set of orientation calculating algorithms. The orientation calculating algorithms use the gradients of the image to obtain the orientation of the keypoints. For example, one algorithm may look for dominant peaks in a histogram of orientations, while another may determine the direction of the average gradient. Thereafter, a patch 422 of the image which encompasses the keypoint is extracted around the keypoint. The extraction of the patch 422 is based on the orientation of the keypoint and a pre-defined sampling factor. An image patch 430 as illustrated in FIG. 4(c) that is aligned with the orientation is created by sampling the original image around the keypoint. The re-sampling can involve, for example, effectively re-rendering an image region and performing an interpolation in order to determine the value at a specific location. Such interpolation and/or remapping can significantly increase the computational requirements of the process. After computing the sub-pixel location of the feature points, the orientations of the selected subset of keypoints are determined.

Once the image is re-sampled and the values adjusted according to the rotation, gradients 424 of the image patch 422 can be determined, normalized, and accumulated into a histogram vector 444, as illustrated in the situation 440 of FIG. 4(c), where a gradient will end up in a particular vector element based at least in part upon the spatial location within the patch and the gradient direction. In this example, all gradients in the upper left bin of the image patch are mapped into one of the first four elements 442, with the specific element depending at least in part upon the direction. Similarly, the gradients in the lower right bin of the image patch will be mapped into one of the last four elements. Further detail of such a process can be found, for example, in co-pending U.S. patent application Ser. No. 12/319,992, filed Jan. 14, 2009, and entitled "Method and System for Representing Image Patches," which is hereby incorporated herein by reference.

A potential downside to such an approach is that the resampling of the image required in the process described above can require a significant amount of computation. Further, the number of gradients in the image patch that are computed further requires a significant amount of computation. As mentioned, it is important to make the feature descriptor determination process as efficient as possible.

Approaches in accordance with various embodiments utilize a polar accumulated signed gradient (PASG)-based approach to image matching in order to reduce the computation requirements of various conventional approaches. In addition to utilizing polar coordinates, however, a PASG-based approach can also replace the image resampling portion of a conventional process to create a canonically-oriented image patch. An approach in accordance with various embodiments can achieve rotational invariance by rotating the spatial bins and gradient vectors that are computed using the original image, which requires significantly less computation than conventional approaches. Further, the resampling of conventional approaches can add unintended smoothing to the patch.

Further, approaches in accordance with various embodiments can also approximate weighting the contribution of gradients in different spatial locations by sub-sampling gradients in that bin. The sub-sampling can be a random sampling or other appropriate selection. The use of a sub-sampling reduces the amount of computation as fewer gradients need to be computed, requiring significantly less work and providing higher efficiency and faster results.

Figure 5:
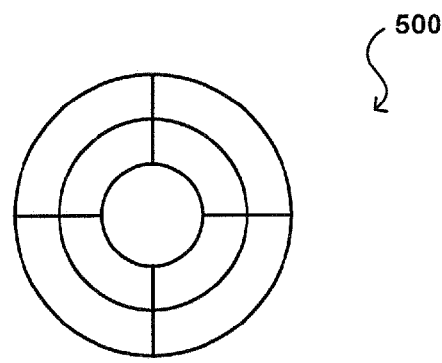
FIG. 5 illustrates an example spatial binning layout that can be utilized in accordance with various embodiments.

FIG. 5 illustrates an example polar spatial binning layout 500 of a PASG descriptor that can be used in accordance with various embodiments. As discussed, conventional approaches rotate the image patch to some canonical orientation to achieve rotational invariance (i.e., enable images to be matched even though there is an orientation difference of an object illustrated in those images). By instead using a spatial binning scheme based on a polar grid instead of a rectilinear grid, for example, the rotational invariance can be obtained by selecting an appropriate bin into which a gradient will fall based on the orientation of the image patch. The gradients can then be adjusted and extracted as desired without rotating or resampling the patch. The gradients also are stored with respect to the dominant patch orientation, such that there is effectively an angle shift to the gradients of the patch. If, for example, the dominant gradient was previously at 90 degrees with respect to the layout of the patch, and a particular gradient was at −30 degrees, the new angle for the gradient would be 120 degrees, or the angle with respect to the dominant orientation or dominant gradient. The angle between the local gradient and the dominant gradient does not change, but the angle is now reflected in terms of relevance to the dominant gradient. The "x-axis" or other such measure of the layout is effectively rotated to the position of the dominant gradient. Such an approach provides the rotational invariance, as the gradients are all represented with respect to the dominant gradient, irrespective of the orientation of that dominant gradient with respect to the original image, and without requiring a rotation and resampling of the image.

In order to implement the PASG descriptor, a lookup table can be generated in a pre-processing step, for example, that has the desired image patch size and stores the angular location of each pixel relative to the center point of a patch. The gradient vector then can be rotated by the patch orientation. The spatial bin into which the gradient will fall can be determined by adding an offset, equal to the rotation of the orientation vector for the patch, to the pre-computed angular location of the pixel. The adjusted angular location then can be used to compute the angular bin into which to place the gradient. Such an approach provides an efficient way to effectively "rotate" the spatial bins, instead of rotating the pixel values. This "bin rotation" is essentially free, and much less computationally expensive than rotating portions of the image. In some embodiments the bin rotation can be effectively pre-computed, as knowing the angle enables the process to determine which gradients to place in which bins. When rotating an image, such pre-computing is not possible as the image is not available until the last second. The directional bin can be determined using an approach similar to that discussed above with respect to a standard ASG-based approach including four directional bins: +x, −x, +y, and −y.

Figure 6:
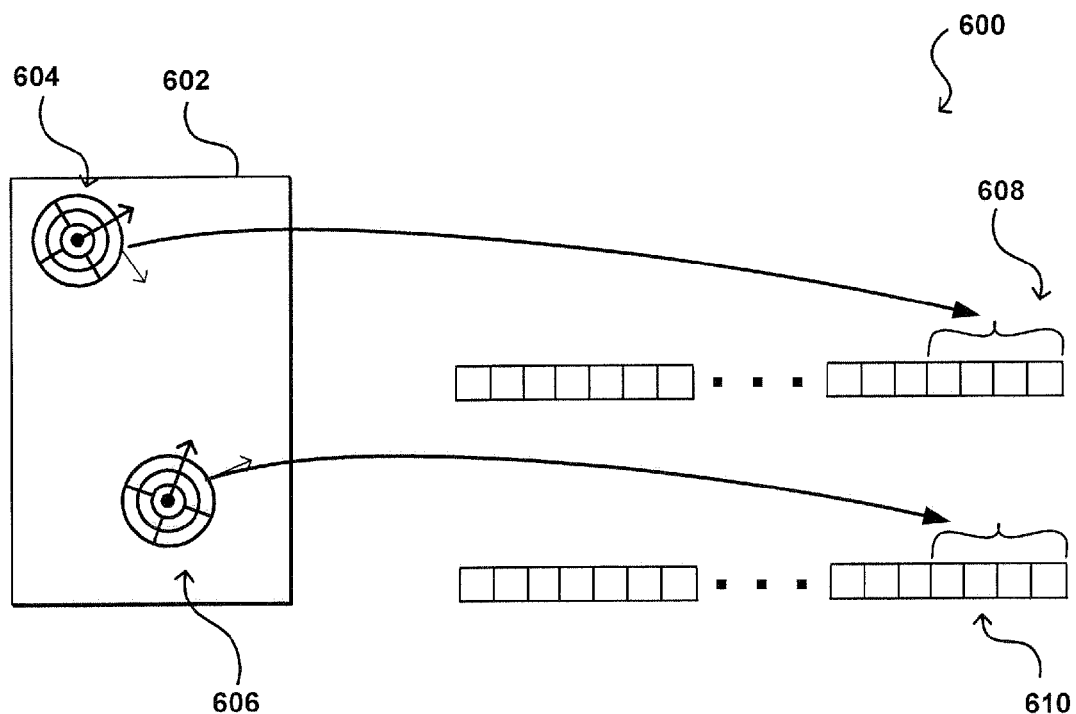
FIG. 6 illustrates an example approach to generating a histogram vector using polar binning layouts that can be utilized in accordance with various embodiments.

FIG. 6 illustrates an example situation 600 wherein the bins are rotated instead of the image for two feature vectors of the same image 602. In this example, gradients at different locations relative to the center point can end up in the same element since the underlying bin has been rotated by the dominant orientation of the image patch. For example, the gradient illustrated for the first spatial binning layout 604 is shown to be in a different location than the gradient for the second spatial binning layout 606. When considering those gradients with respect to the corresponding dominant orientation or dominant gradient, however, the gradients can have similar attributes causing them to be placed in the same underlying bin, and thus the same portions 608, 610 of the histogram vector.

Figure 7:
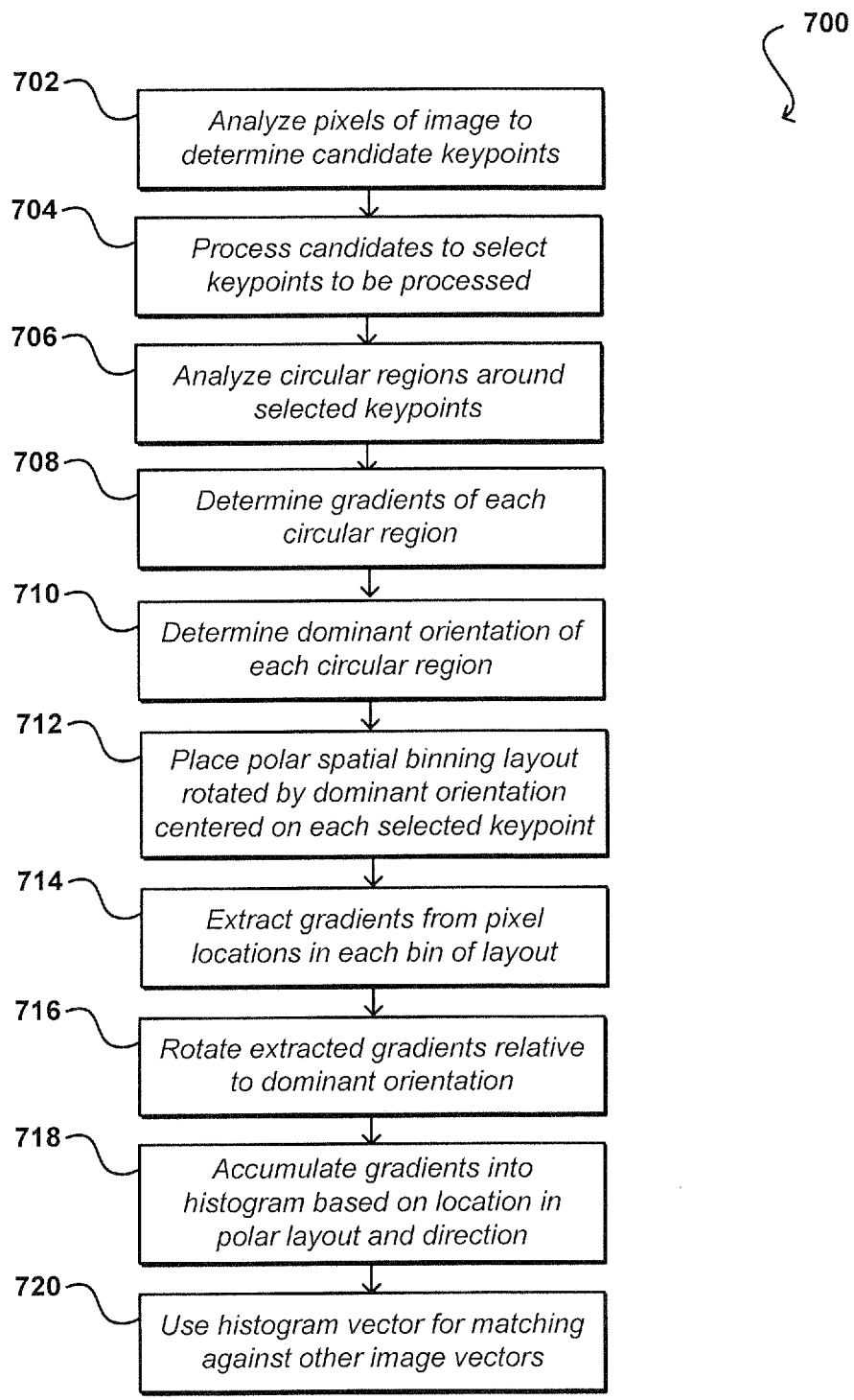
FIG. 7 illustrates an example process for generating a histogram vector that can be utilized in accordance with various embodiments.

FIG. 7 illustrates an example process 700 that can be used in accordance with various embodiments. It should be understood, however, that there can be additional, fewer, or alternative steps performed in similar or alternative orders, or in parallel, within the scope of the various embodiments unless otherwise stated. In this example, an image is received that is to be analyzed for matching. The pixels of the image are analyzed 702 to determine a set of candidate keypoints, which in at least some cases can include local maxima and/or minima among neighboring pixels. The candidate keypoints can be processed 704 with one or more selection algorithms to select a set of keypoints to be processed. The number of keypoints can be a fixed number, up to a maximum number, a number relative to a number of determined regions of an image, or another such value. For each keypoint in the set, a circular region of the image around that keypoint can be analyzed 706, and the gradients of each circular region determined 708. As discussed, the gradients can be normalized or otherwise processed for comparison. The gradients then can be analyzed to determine 710 the dominant orientation, or dominant direction, of the circular region. A polar spatial binning layout then can be placed 712 so as to be centered on each selected keypoint of the set, with the polar spatial binning layout being rotated by the respective dominant orientation. Gradients then can be extracted 714 from various pixel locations (e.g., all or a sampling) in each bin of the layout, with the angle or direction of each of the gradients being rotated 716 such that the angles or direction of each gradient is stored relative to the respective dominant orientation. After the gradients are adjusted relative to the dominant orientation, a histogram vector can be generated by accumulating 718 the gradients into elements of the histogram vector based on the bin locations of those gradients in the polar layout and the direction of the gradient. The histogram vector can then be used 720 to compare the image against histogram vectors for other images using known approaches for comparing histogram vectors. If one or more matches are found, information for at least one of those matches can be provided to the user submitting the image to be matched.

As an additional computational savings, approaches in accordance with various embodiments can also weight the gradient computation through sampling. As mentioned, it is often the case that gradients do not contribute equally to the accumulated sum. For example, in the PASG layout of FIG. 5 the outer annulus has a larger area than an inner annulus. If all pixels were treated equally, the resultant vector would be biased to have larger values in the vector elements corresponding to these outer spatial bins, and in effect would the outer bins as being more important. In many cases, however, it can be desirable to actually treat the outer annulus as less important than the inner ones, as the outer bins can be more susceptible to errors induced by observing the feature point at different angles. A common procedure is to weight gradients by some factor before performing the accumulation. A process might determine how many more points are in the outer region, and might set a weighting for those points so they affect the result no more than points in the inner-most annulus. Such procedure again adds significant computational requirements on the processing.

Figure 8:
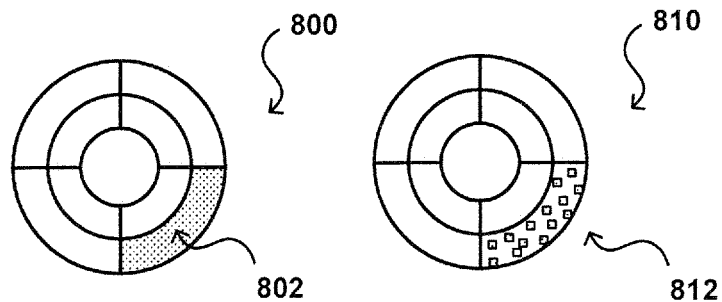
FIG. 8 illustrates an example sampling approach that can be utilized in accordance with various embodiments.

Approaches in accordance with various embodiments can instead approximate the weighting through sampling. FIG. 8 illustrates an example wherein a bin 802 of a first view of a layout can instead be approximated by a sampling of portions 812 of the bin, as illustrated in the second view 810 of the layout. In this example, the process might intend to weight all the pixels in the spatial bin 802 by one half. This can effectively be achieved by instead selecting a sampling 812 of half the pixels in the bin and giving those pixels a full weight. Such an approach can reduce the number of gradients to be computed in half, and also prevents by multiplication of the gradients by a weighting factor. Such an approach can provide a reasonable approximation, as most images exhibit spatial coherencies such that nearby pixels often have similar gradients.

Figure 9:
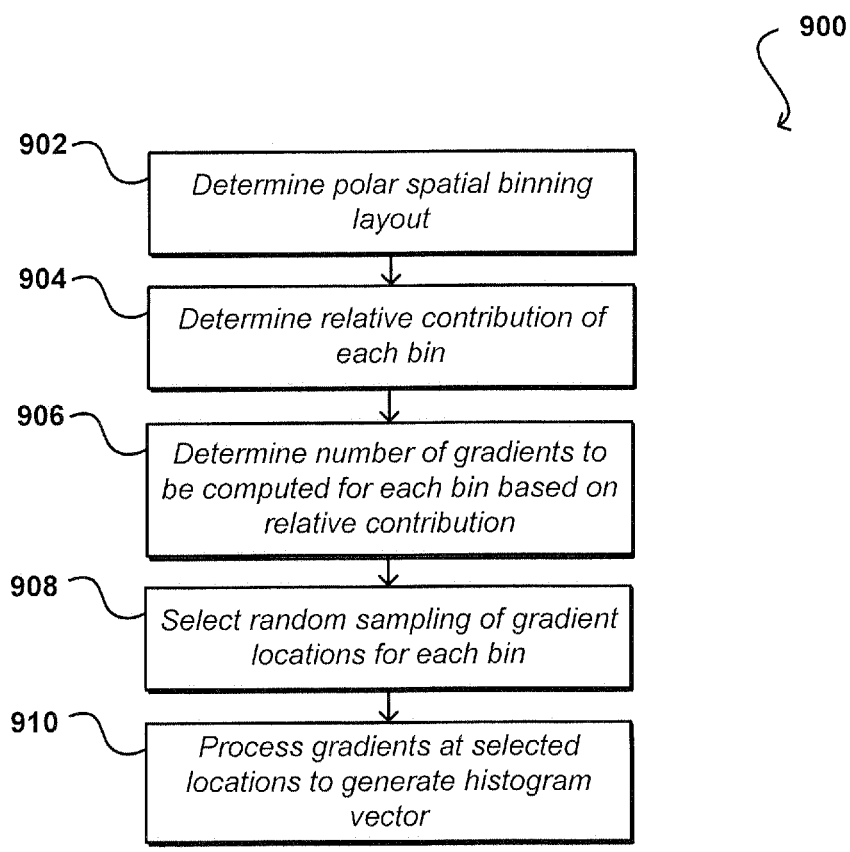
FIG. 9 illustrates an example process for generating a histogram vector using bin sampling that can be utilized in accordance with various embodiments.

FIG. 9 illustrates an example process 900 for utilizing sampling when generating a feature vector for an image in accordance with various embodiments. In this example, the patch layout for image matching is determined 902. This can include, for example, selecting a polar spatial binning layout with a specific number of bins along a radial axis and having a particular relative size. Based at least in part upon the determined layout, a relative contribution of each bin can be determined 904. Based at least in part upon the determined contribution, a number of the gradients of each bin to be processed can be determined 906. For example, if the bin would include twice as many gradients as another bin, half of the gradients of that bin might be selected. A random sampling of gradient locations is determined 908 for the number of determined gradients to processed in each bin. As discussed, the sampling can be selected using any appropriate mechanism, and in some embodiments can be saved for use with subsequent images to be analyzed. For an image to be processed, the gradients at each of the selected gradient locations can be processed 910 to generate a histogram vector or other such object useful in matching that image against information for other images stored in an image data store or other such location.

As mentioned, a determination can be made as to how much each bin should count toward the final result. Instead of weighting a bin by a factor such as alpha, for example, an alpha-based fraction of the gradients in the bin can be selected for processing. Alpha can be determined using any appropriate determination approach, such as by comparing the relative areas of the various bins. Additionally, some approaches can utilize a linear (or non-linear) falloff function such that gradients weigh less, or are sampled less frequently, towards the outer edge of the PASG layout. Logarithmic or other such functions can be used as well within the scope of the various embodiments. As long as the gradients are at least somewhat spatially coherent, such an approximation can provide reasonable accuracy while significantly reducing the amount of work needed to perform the processing. The accuracy can depend upon factors such as the spatial coherence and gradient variation, for example, but since gradients are not totally random in most real world situations, such an approach can provide a reasonable approximation. In at least some embodiments, a user can have the ability to increase or decrease the number of gradients included in a sample, in order to balance accuracy and computational savings to the satisfaction of the user, application, etc.

When the number of pixels to sample is selected, the pixels to be sampled are selected. In at least some embodiments, the locations of the pixels to be sampled are selected at random. In at least some embodiments, the pixel locations are pre-computed for the number of samples, such that the sampling locations can be reused without the need to perform a random selection each time. The initial sampling pattern can be saved for future use. In certain situations it can be desirable for the outer regions to count less than the inner regions. For example, increased distance from the keypoint can result in increased divergence with small changes in angle. Closer to the feature point, little variance might be noticed for small rotations. Similar effects occur for changes in scale, where points near the center can exhibit less variance than points further out.

Figure 10:
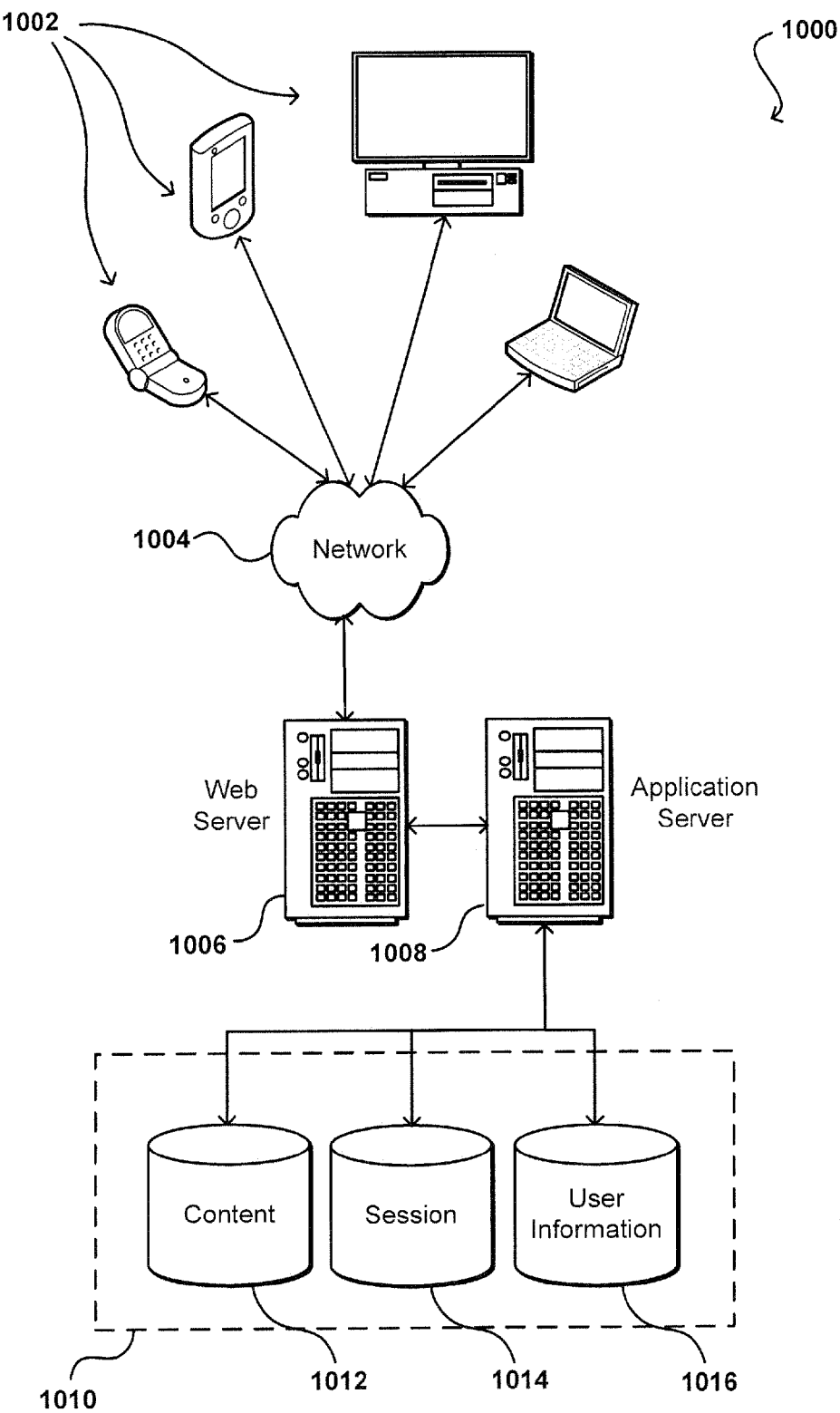
FIG. 10 illustrates an example environment in which aspect of the various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type.

The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle*, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of generating a histogram for an image, comprising:

under control of one or more computing systems configured with executable instructions, determining a set of keypoints for an image;

analyzing a circular region of the image around each of the set of keypoints;

determining a dominant orientation of each of the circular regions based at least in part upon a plurality of gradients of each of the circular regions;

positioning a polar spatial binning layout to be centered on each of the set of keypoints, each of the polar spatial binning layouts being rotated relative to the dominant orientation;

extracting a set of gradients from pixel locations within the bins of each polar spatial binning layout, the extracted gradients being rotated relative to the dominant orientation; and generating a histogram by accumulating the gradients into positions based at least in part on the bin assigned to each gradient and the direction of the gradient.

2. The computer-implemented method of claim 1, wherein each polar spatial binning layout contains a central bin and a plurality of concentric annular bins.

3. The computer-implemented method of claim 2, further comprising:

determining a number of gradients to be processed for each bin of the polar spatial binning layout in order to adjust a relative contribution of the bins.

4. The computer-implemented method of claim 3, wherein the relative contribution is an even contribution, a contribution that decreases linearly with increasing distance from the keypoint, or a contribution that decreases logarithmically with increasing distance from the keypoint.

5. The computer-implemented method of claim 3, wherein a user is able to adjust the number of gradients to be processed in order to adjust at least one of speed or accuracy.

6. The computer-implemented method of claim 1, further comprising:

determining a set of candidate keypoints in the image by locating local minima or maxima among neighboring pixels in the image; and processing the set of candidate keypoints to select the set of keypoints.

7. The computer-implemented method of claim 1, wherein generating the histogram does not require a rotation or resampling of the image.

8. The computer-implemented method of claim 1, wherein each gradient is assigned to a bin based at least in part upon the dominant orientation of the corresponding polar spatial binning layout.

9. The computer-implemented method of claim 1, further comprising:

normalizing the histogram.

10. A non-transitory computer-readable storage medium storing instructions that, when executed by at least one processor of a computing device, cause the computing device to:

determine a set of keypoints for an image;

determine a dominant orientation of each of the circular regions by analyzing a region of the image around each of the set of keypoints;

position a polar spatial binning layout to be centered on each of the set of keypoints, each of the polar spatial binning layouts being rotated relative to the determined dominant orientation;

extract a set of gradients from locations within the bins of each polar spatial binning layout, the extracted gradients being rotated relative to the dominant orientation; and generate a histogram by accumulating the gradients into positions based at least in part on the bin assigned to each gradient and the direction of the gradient.

11. The non-transitory computer-readable storage medium of claim 10, wherein generating the histogram does not require a rotation or resampling of the image.

12. The non-transitory computer-readable storage medium of claim 10, wherein each gradient is assigned to a bin based at least in part upon the dominant orientation of the corresponding polar spatial binning layout.

13. The non-transitory computer-readable storage medium of claim 10, wherein the instructions when executed further cause the computing device to:

determine a set of candidate keypoints in the image by comparing at least a portion of pixels in the image to neighboring pixels in the image; and process the set of candidate keypoints to determine the set of keypoints.

14. The non-transitory computer-readable storage medium of claim 10, wherein the instructions when executed further cause the computing device to:

determine a number of gradients to be processed for each bin.

* * * * *